July 18, 1961
M. TAYLOR
2,992,562
GYROSCOPIC SUSPENSION
Filed Aug. 6, 1957
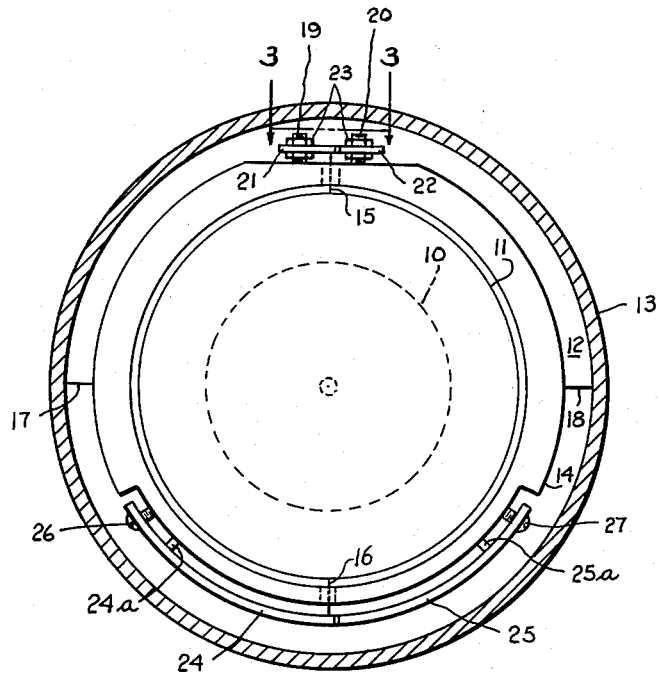
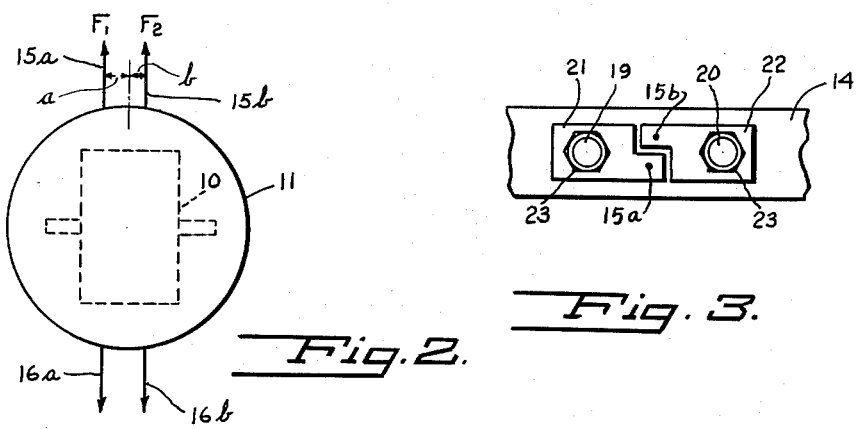
INVENTOR.
MARVIN TAYLOR
BY
*Raymond A. Paquin*
ATTORNEY.

United States Patent Office 2,992,562
Patented July 18, 1961

2,992,562
GYROSCOPIC SUSPENSION
Marvin Taylor, Bethpage, N.Y., assignor to American Bosch Arma Corporation, a corporation of New York
Filed Aug. 6, 1957, Ser. No. 676,612
5 Claims. (Cl. 74—5)

This invention relates to floating gyroscopic devices, and has particular reference to the wire suspension means employed in conjunction therewith.

In fluid suspended gyroscopic devices of the class typified, for example, by the compass described in U.S. Patent 2,677,194, it is desirable that the center of suspension provided by the torsion wires and the center of buoyancy of the floating gyro casing are closely aligned in order to minimize the torques on the gyro which result from any variation in the fluid temperature.

In the present invention, at least one of the elements of the torsion wire suspension is a double wire suspension which consists of a pair of torsion wires and means for individually adjusting the tension in each wire for controlling the distribution of tension between the two wires.

The center of suspension will then lie on the axis defined by the resultant of the tensions in the two wires. Preferably, the opposite torsion elements of the suspension are also of the double wire type of this invention in order to provide a greater range of control of the center of suspension.

The center of suspension will, of course, be moved only in the plane containing the double wires. The wires can be arranged so that this plane has any desired orientation with respect to the gyro spin axis.

For a better understanding of the invention, reference may be had to the diagrams in which—

FIG. 1 is a cross sectional view of part of a floated gyroscope;

FIG. 2 is an explanatory diagram; and

FIG. 3 is a detail of one part of FIG. 1, as viewed through the plane 3—3.

With reference now to FIG. 1 of the drawings, there is shown a cross sectional view of a portion of a gyroscopic device including a gyroscopic wheel 10 in a spherical shell 11. The shell or supporting structure 11 is suspended in substantial neutral equilibrium in the heavy fluid 12 with which the tank 13 is filled. Shell 11 is connected to the gimbal ring 14 by means of torsion wires 15, 16, which are located diametrically opposite one another and which aid in keeping the sphere 11 centered in the tank 13, among other things. The gimbal ring 14 is also suspended in substantial neutral floatation in the fluid 12 and is connected to the tank 13 by means of the torsion wires 17 and 18 which are perpendicularly disposed to the wires 15, 16 and which also aid in centering the sphere 11. Wires 17 and 18 may be attached to tank 13 and gimbal ring 14 by suitable conventional means such as that shown in Patent 2,740,299.

Complete gyro systems employing gyroscopic elements of this type are now known in the art and are exemplified by the gyro compass described in U.S. Patent 2,677,194, issued May 4, 1954, to R. L. Bishop for "Gyroscopic Compass" although they are not limited thereto.

Variation of the temperature of the fluid 12 disturbs neutral buoyancy which may result in undesirable torques on the gyro 10 unless the center of buoyancy of the shell 11 coincides with the center of suspension of members 15, 16, 17 and 18. It is essential, therefore, that the center of suspension be closely aligned with the center of buoyancy in order to minimize the effects of these error producing torques.

To this end, the torsion wires 15, 16 are provided in pairs as illustrated schematically in FIG. 2, where the pair of wires 15a and 15b are attached to the sphere 11 and a second pair of wires 16a and 16b are attached to the sphere 11 at diametrically opposite locations. As will be described, the tension in each of the wires is independently adjustable and by suitable distribution of the tension between the wires, the center of suspension may be shifted so as to align it with the center of buoyancy of the gyro 10 and shell 11.

For reason of clarity, the spacing of the wires is greatly exaggerated in FIG. 2, the spacing in practice being on the order of one-tenth of an inch or so.

It will be seen that if the tension in wire 15a is $F_1$ and the tension in wire 15b is $F_2$ then the suspension axis will lie between the wires 15a and 15b at a distance $a$ from wire 15a and a distance $b$ from wire 15b, where $a$ and $b$ are related according to the formula $F_1 a = F_2 b$. Since the range of adjustment of the suspension axis at the center of the sphere 11 is only half of that at the wires 15a and 15b if the wires 16a and 16b are under equal tension, it is preferable to adjust the tension in wires 16a and 16b for increased range of adjustment. In a particular embodiment of the tension adjusting means as shown in FIGS. 1 and 3, the adjusting control is conveniently located at the side of the wires 15a, 15b since the wire spacing is too small to permit direct attachment to the wires. In this embodiment, a pair of threaded studs 19, 20 are affixed to a flattened portion of the gimbal ring 14. Each stud 19, 20 carries a rigid strap 21, 22 respectively which is clamped in position by the locknuts located on both sides of the strap 21 or 22. The wire 15a is firmly attached to the outer end of strap 21 and the wire 15b is similarly attached to the end of strap 22. It will be seen in FIG. 3, that the ends of the straps may be shaped to suit the wire spacing, if necessary.

The tension on the wires 15a, 15b may be adjusted by positioning the straps 21, 22 as required. The studs 19, 20 may be non-cylindrical and the holes in the straps 21, 22 of corresponding shape to preclude rotation of the straps during the adjustment.

In an alternative arrangement, the straps 21, 22 may be relatively long cantilever springs 24, 25, such as those shown in the lower half of FIG. 1, and applied to the wires 16a and 16b. These springs 24, 25 are pivoted at 24a, 25a respectively and adjusted by screws 26, 27. Rotation of the screw 26 urges the end of spring 24 which is nearest in one direction whence the end attached to the wire 16a is urged in the opposite direction to increase or decrease the tension accordingly.

Other adjusting means will readily occur to those skilled in the art. The particular embodiments shown are merely illustrative and are not intended to limit the scope of the appended claims in any way.

I claim:

1. In a device of the character described, a supporting structure, a gyroscopic wheel mounted for rotation in said supporting structure, a gimbal ring, a plurality of laterally displaced juxtaposed plane defining suspension members connected between said gimbal ring and said supporting structure and suspending said supporting structure in said gimbal ring and tension adjusting means for individually adjusting the tension in each of said suspension members for shifting the center of suspension in said plane.

2. In a device of the character described, a supporting structure, a gyroscopic wheel mounted for rotation in said supporting structure, a gimbal ring, a plurality of laterally displaced juxtaposed plane defining suspension members connected between said gimbal ring and said supporting structure and suspending said supporting structure in said gimbal ring and tension adjusting means for individually adjusting the tension in each of said suspension members for shifting the center of suspension in said plane, a tank and means suspending said gimbal ring in said tank.

3. In a device of the character described, a supporting structure, a gyroscopic wheel mounted for rotation in said suporting structure, a gimbal ring, a plurality of laterally displaced juxtaposed plane defining suspension members connected between said gimbal ring and said supporting structure and suspending said supporting structure in said gimbal ring and tension adjusting means for individually adjusting the tension in each of said suspension members for shifting the center of suspension in said plane, said tension adjusting means comprising cantilever spring leaves.

4. In a device of the character described, a supporting structure, a gyroscopic wheel mounted for rotation in said supporting structure, a gimbal ring, a plurality of laterally displaced juxtaposed plane defining suspension members connected between said gimbal ring and said supporting structure and suspending said supporting structure in said gimbal ring and tension adjusting means for individually adjusting the tension in each of said suspension members for shifting the center of suspension in said plane, said tension adjusting means comprising cantilever spring leaves, and means for adjusting said cantilever spring leaves relative to said gimbal ring.

5. In a device of the character described, a supporting structure, a gyroscopic wheel mounted for rotation in said supporting structure, a gimbal ring, a plurality of laterally displaced juxtaposed plane defining suspension members connected between said gimbal ring and said supporting structure and suspending said supporting structure in said gimbal ring and tension adjusting means for individually adjusting the tension in each of said suspension members for shifting the center of suspension in said plane, said tension adjusting means comprising cantilever spring leaves, and means for adjusting said cantilever spring leaves relative to said gimbal ring, said adjusting means comprising threaded members in threaded engagement with said gimbal ring.

References Cited in the file of this patent

UNITED STATES PATENTS

| | | |
|---|---|---|
| 1,797,913 | Henderson | Mar. 24, 1931 |
| 2,176,804 | Roth et al. | Oct. 17, 1939 |
| 2,409,178 | Allison et al. | Oct. 15, 1946 |
| 2,740,299 | Jewell | Apr. 3, 1956 |
| 2,855,781 | Alburger | Oct. 14, 1958 |